United States Patent
Sugai et al.

(10) Patent No.: US 10,326,705 B2
(45) Date of Patent: Jun. 18, 2019

(54) COMMUNICATION DEVICE AND COMMUNICATION METHOD

(71) Applicant: ALAXALA Networks Corporation, Kawasaki-shi, Kanagawa (JP)

(72) Inventors: Kazuo Sugai, Kawasaki (JP); Takeshi Kumagai, Kawasaki (JP); Yuichi Ishikawa, Kawasaki (JP); Naoya Kumita, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 179 days.

(21) Appl. No.: 15/455,627

(22) Filed: Mar. 10, 2017

(65) Prior Publication Data
US 2017/0289055 A1    Oct. 5, 2017

(30) Foreign Application Priority Data

Mar. 30, 2016  (JP) ................................ 2016-067048
Jan. 13, 2017  (JP) ................................ 2017-003781

(51) Int. Cl.
| H04L 12/28 | (2006.01) |
| H04L 12/823 | (2013.01) |
| H04L 12/815 | (2013.01) |
| H04L 12/835 | (2013.01) |

(52) U.S. Cl.
CPC .............. H04L 47/32 (2013.01); H04L 47/22 (2013.01); H04L 47/30 (2013.01)

(58) Field of Classification Search
CPC .......... H04L 47/32; H04L 47/22; H04L 47/30
See application file for complete search history.

(56) References Cited

U.S. PATENT DOCUMENTS

| 6,473,432 | B1 * | 10/2002 | Nishimura ......... H04Q 11/0478 370/412 |
| 6,570,876 | B1 | 5/2003 | Aimoto |
| 7,136,356 | B2 * | 11/2006 | Suzuki ................ H04L 12/5601 370/235 |
| 2005/0201373 | A1 | 9/2005 | Shimazu et al. |
| 2009/0141732 | A1 * | 6/2009 | Woo ........................ H04L 47/10 370/412 |
| 2012/0188874 | A1 | 7/2012 | Kumagai et al. |

FOREIGN PATENT DOCUMENTS

| JP | 11-346246 A | 12/1999 |
| JP | 2005-295524 A | 10/2005 |
| JP | 2013-034164 A | 2/2013 |

* cited by examiner

*Primary Examiner* — Stephen M D Agosta
(74) *Attorney, Agent, or Firm* — Mattingly & Malur, PC

(57) ABSTRACT

In a core node, packet related information included in a packet is extracted, a virtual queue length, which is an estimated value of a queue length of a transmission queue addressed to a user in an edge device, is calculated and held on a user basis on the basis of the packet related information and band information of a line between the edge device and the user, and a determination is made, on a user basis, as to whether or not band control is required, on the basis of the virtual queue length and predetermined conditions so as to perform, on the basis of the result of the determination, the band control of the packet addressed to the user on a user basis in a packet relay part.

12 Claims, 14 Drawing Sheets

FIG. 3

VIRTUAL QUEUE LENGTH TABLE ~1221

| INDEX<br>= USER IDENTIFIER<br>12211 | DATE AND<br>TIME OF<br>UPDATE<br>12212 | VIRTUAL<br>QUEUE<br>LENGTH<br>12213 | MAXIMUM<br>VIRTUAL<br>QUEUE LENGTH<br>12214 | OUTPUT<br>BAND<br>12215 | MAXIMUM<br>ALLOWABLE<br>VIRTUAL<br>QUEUE LENGTH<br>12216 | DISCARD<br>STATISTICS<br>12217 | RELAY<br>STATISTICS<br>12218 |
|---|---|---|---|---|---|---|---|
| USER A | | | ... | 100Mbps | 2MByte | | |
| USER B | | | ... | 1Gbps | 1MByte | | |
| USER C | | | ... | 50Mbps | 2MByte | | |

FIG. 12

| INDEX | USER IDENTIFIER | VIRTUAL QUEUE MAXIMUM OCCUPATION RATIO |
|---|---|---|
| 0 |  | 100% |
| ⋮ | ⋮ | ⋮ |
| 5 | USER A | 100% |
| ⋮ | ⋮ | ⋮ |
| 9 |  | 100% |
| 10 |  | 90% |
| ⋮ | ⋮ | ⋮ |
| 7000 | USER C | 10% |
| ⋮ | ⋮ | ⋮ |
| 9999 |  | 1% |

FIG. 13

| INDEX = USER IDENTIFIER | DESTINATION ADDRESS RANGE | OUTPUT BAND | MAXIMUM ALLOWABLE VIRTUAL QUEUE LENGTH | SHAPER QUEUE REGISTRATION PRESENCE/ ABSENCE | SHAPER QUEUE NUMBER |
|---|---|---|---|---|---|
| ⋮ | ⋮ | ⋮ | ⋮ | ⋮ | ⋮ |
| USER A | RANGE A | 100Mbps | 2MByte | PRESENCE | 100 |
| ⋮ | ⋮ | ⋮ | ⋮ | ⋮ | ⋮ |
| USER B | RANGE B | 1Gbps | 1MByte | ABSENCE | — |
| ⋮ | ⋮ | ⋮ | ⋮ | ⋮ | ⋮ |
| USER C | RANGE C | 50Mbps | 2MByte | PRESENCE | 200 |
| ⋮ | ⋮ | ⋮ | ⋮ | ⋮ | ⋮ |

FIG. 14

| INDEX = SHAPER QUEUE NUMBER | USER IDENTIFIER | INDEX OF SHAPER QUEUE SEARCH TABLE | INDEX OF USER IDENTIFIER TABLE LISTED IN ORDER OF VIRTUAL QUEUE MAXIMUM OCCUPATION RATIO |
|---|---|---|---|
| | ⋮ | ⋮ | ⋮ |
| 100 | USER A | 10 | 5 |
| | ⋮ | ⋮ | ⋮ |
| 200 | USER C | 20 | 7000 |
| | ⋮ | ⋮ | ⋮ |

COMMUNICATION DEVICE AND COMMUNICATION METHOD

BACKGROUND OF THE INVENTION

1. Field of the Invention

The present invention relates to a communication device and a communication method for detecting and predicting packet discarding caused by burst traffic or the like in a network, and for smoothing packet flow.

2. Description of the Related Art

As a technique for performing the band control of packet flow in a network or for ensuring the communication quality in the network, there are techniques disclosed in, for example, JP 11-346246 A and JP 2013-34164 A.

JP 11-346246 A discloses a transmission priority control device that classifies transmission packets into a plurality of queue groups, each of which has an individual band assigned thereto, according to header information of each of the packets in a network, and that queues transmission packets in a buffer memory in such a manner that a plurality of queues are formed on a transmission priority basis in each queue group, and discloses a packet-read control device that reads a transmission packet from each queue group of the buffer memory according to transmission priority while ensuring the band assigned to the queue group.

JP 2013-34164 A discloses a repeater provided with: a distribution part for, while suppressing the capacity of the buffer used as a queue, in order to ensure the communication quality of flow corresponding to a large number of users and services, distributing and storing a received communication packet to any of the plurality of queues according to a value determined by a predetermined function in which output is integrated with respect to input, by using delivery information about delivery of a communication packet as an input value; and a band control part that controls a band on a queue bases to output, for transmission, communication packets accumulated in a plurality of queues.

In addition, JP 2005-295524 A discloses the technique for, without actually inserting a packet, by using a virtual packet queue that manages only a queue length, controlling whether to insert an actual packet into a real packet queue, or to discard the actual packet, on the basis of the queue length and discard conditions that are held by the virtual packet queue. This document indicates that the discard conditions are determined on the basis of the total queue length of the plurality of queues.

SUMMARY OF THE INVENTION

Traffic from a server toward a user is transmitted from a line, the communication speed of which is high, and which is close to the server, to an edge node that accommodates a user line, through a network. The edge node that accommodates the user line has a queue that accumulates traffic directed to the user line. However, the speed of the user line is lower than that of a line in the network, and therefore the queue may overflow, causing a packet to be discarded.

Packet loss in the edge node can be reduced by subjecting communication packets to shaping on a user basis in a core node in the network. However, in order to reduce the packet loss in the edge node, it is necessary to provide queues for all users including a user that is not currently under communication, and to set communication-packet header conditions for user identification and a band of each queue in the core node. Therefore, it is difficult to accommodate a large number of users, for example, on a 100,000 user scale.

As disclosed in JP 11-346246 A or JP 2013-34164 A, in the method in which a communication packet is distributed into any of the plurality of queues by referring to the table, or by using the predetermined function, from the header information and delivery information of the communication packet in the node in the network, it is possible to increase the number of users that can be accommodated. However, a plurality of communication packets directed to user lines enters one queue, and therefore the problem is that the precise control on a user basis is not possible, and it is difficult to manage fairness on a user basis.

The present invention has been made to solve the above-described problem, and an object of the present invention is to provide a technique for, even when the number of queues that are subjected to shaping in the core node is smaller than the number of all accommodated users in a network to which a large number of users are connected, avoiding the overflow of packets in the edge node for all users.

In order to solve the problem, the present invention provides, as an example, a communication device that transmits, to a network, a packet addressed to a user, the packet being delivered from a server, and that transmits, to the server, a packet received through the network, wherein the communication device is configured to, when a packet addressed to a user is transmitted to the user from an edge device located at an edge of the network, extract packet related information included in the packet, calculate, on a user basis, a virtual queue length, which is an estimated value of a queue length of a transmission queue addressed to the user in the edge device, on the basis of the packet related information and band information of a line between the edge device and the user to hold the virtual queue length, and determine, on a user basis, whether or not band control is required, on the basis of the virtual queue length and predetermined conditions so as to perform the band control of the packet addressed to the user on a user basis in a packet relay part.

According to the present invention, in a network to which a large number of users are connected, even when the number of queues that are subjected to shaping in a core node is smaller than the number of all accommodated users, the overflow of packets in an edge node can be avoided for all users.

BRIEF DESCRIPTION OF THE DRAWINGS

FIG. 3 shows an example of a virtual queue length table in the virtual queue length updating part;

FIG. 12 is a diagram illustrating an example of a user identifier table listed in order of the virtual queue maximum occupation ratio;

FIG. 13 shows an example of a user information table;

FIG. 14 shows an example of a shaper queue management information table;

DESCRIPTION OF THE PREFERRED EMBODIMENTS

Embodiments will be described below with reference to drawings.

First Embodiment

Figure 1:
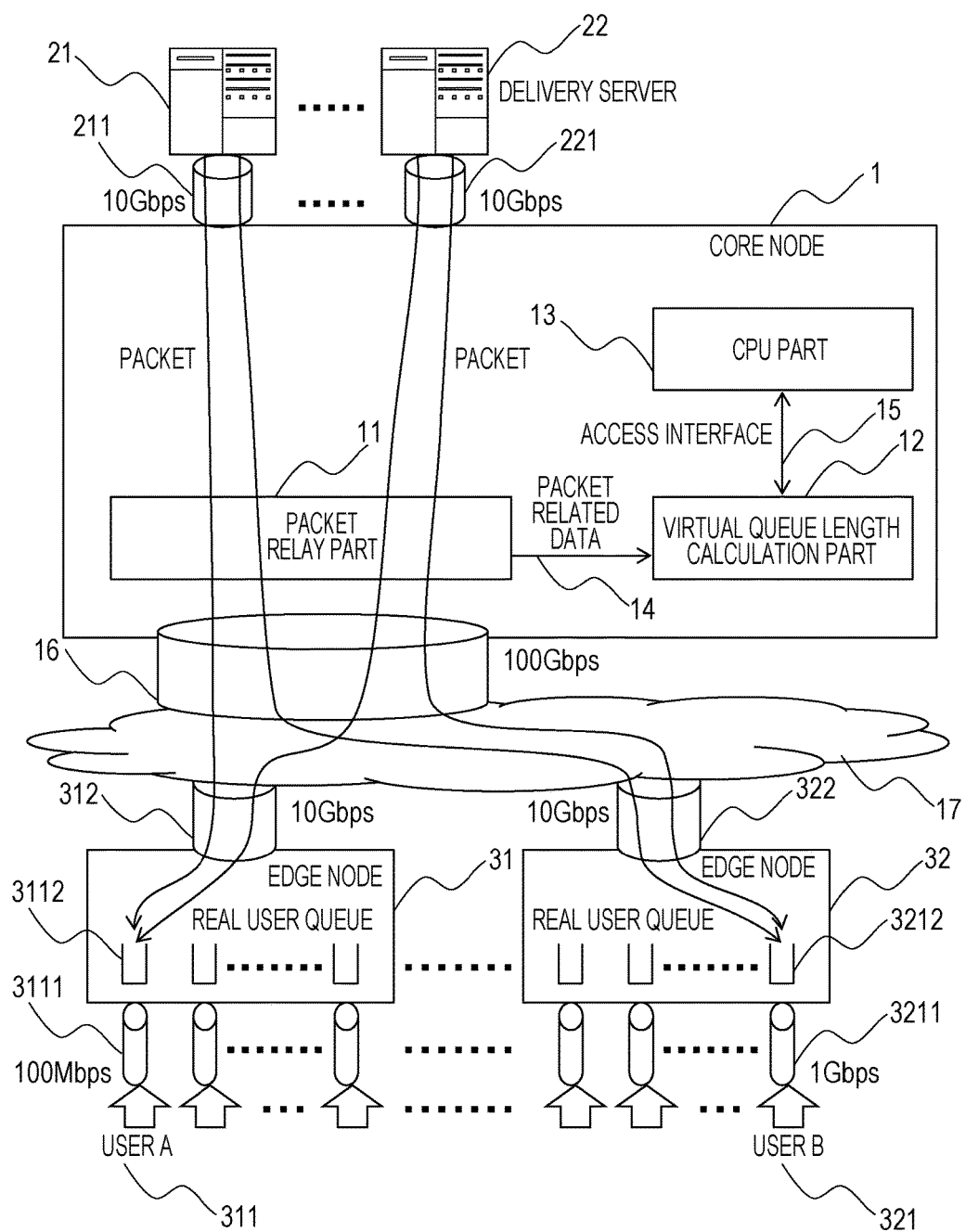
FIG. 1 is a diagram illustrating an example of a network configuration to which the present invention is applied, and a configuration of a core node according to one embodiment of the present invention.

FIG. 1 is a diagram illustrating an example of a network configuration to which the present invention is applied, and a configuration of a core node according to one embodiment of the present invention.

Reference numeral 1 denotes a core node that implements the present invention. Delivery data is relayed from each of delivery servers 21, 22, each of which delivers data such as a moving image, to a user A 311 and a user B 321 through a core node 1, a network 17 among the core node 1 and edge nodes 31, 32, and the edge nodes 31, 32. The network 17 represents a network that includes a repeater provided among the core node 1 and the edge nodes 31, 32. However, the network 17 depends on a network configuration. Therefore, there may be a case where the network has no repeater, and the core node 1 is directly connected to the edge nodes 31, 32, or a case where the network has one or a plurality of repeaters through which data is passed.

Each of the delivery servers 21, 22 is a server that provides a plurality of users with services, and thus in general has high processing capability in comparison with the user A 311, the user B 321. Therefore, lines 211, 221 that connect from the delivery servers 21, 22 to the core node 1 respectively each generally have a line speed higher than that of a line 3111 that connects from the edge node 31 to the user A 311, and that of a line 3211 that connects from the edge node 32 to the user B 321. For example, the lines 211, 221 that connect to the delivery servers 21, 22 respectively each have a high line speed of 10 Gbps, and the lines 3111, 3211 that connect to the user A 311 and the user B 321 respectively each have a low line speed of, for example, 100 Mbps, 1 Gbps.

When packets are successively transmitted from the delivery servers 21, 22 to the user A 311 and the user B 321 respectively in a state in which the lines 211, 221 that connect to the delivery servers 21, 22 respectively have line speeds higher than those of the respective lines 3111, 3211 that connect to the user A 311 and the user B 321 respectively, the packets are transmitted at the line speeds of the respective lines 211, 221 that connect to the delivery servers 21, 22 respectively. Accordingly, a queue 3112 that is directed to the line 3111 connecting to the user A 311 and is provided in the edge node 31, and a queue 3212 that is directed to the line 3211 connecting to the user B 321 and is provided in the edge node 32, may overflow.

Figure 2:
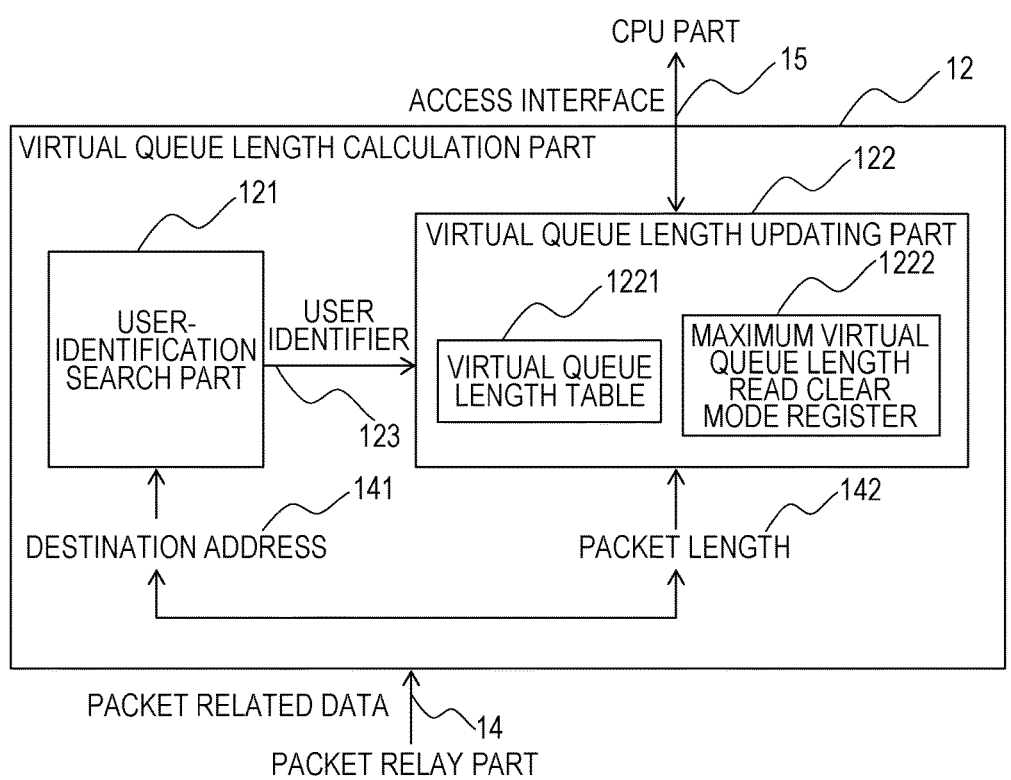
FIG. 2 is a diagram illustrating a configuration of a virtual queue length calculation part in the core node according to one embodiment of the present invention.

FIG. 2 and the drawings thereafter show: a method for detecting, in the core node 1, the overflow of the queues 3112, 3212 in the respective edge nodes, and a configuration for detecting the overflow; and a method for avoiding the overflow of queues in the edge nodes after the detection, and a configuration for avoiding the overflow.

FIG. 2 is a diagram illustrating a configuration of a virtual queue length calculation part 12 in the core node according to one embodiment of the present invention.

Every time a packet relay part 11 shown in FIG. 1 relays a packet, packet related data 14 that is data related to the packet relayed from the packet relay part 11 to the virtual queue length calculation part 12 is transmitted.

A destination address 141 from among the packet related data is transmitted to a user-identification search part 121. The user-identification search part 121 then identifies a user from the destination address, and outputs a unique user identifier 123 on a user basis. The user identifier 123 is transmitted to a virtual queue length updating part 122. A packet length 142 from among the packet related data is transmitted to the virtual queue length updating part 122. The virtual queue length updating part 122 then updates the virtual queue length of the corresponding user in a virtual queue length table 1222, which is a table for storing the virtual queue length on a user basis, on the basis of the user identifier 123 and the packet length 142 that have been output from the user-identification search part. In addition, the virtual queue length calculation part 12 stores the maximum virtual queue length that indicates the past maximum value of the virtual queue length. When the CPU part 13 reads the maximum virtual queue length indicating the past maximum value of the virtual queue length via an access interface 15, the virtual queue length calculation part 12 switches the operation of whether or not to clear the maximum virtual queue length by a set value of a maximum virtual queue length read clear mode register 1222.

FIG. 3 shows an example of a virtual queue length table 1221 in the virtual queue length updating part 122.

The virtual queue length table 1221 uses a user identifier 12211 as an index, and is composed of, as elements of the table, date and time of update 12212 of the virtual queue length, virtual queue length 12213, maximum virtual queue length 12214 that indicates the past maximum value of the virtual queue length, output band 12215 of the virtual queue, maximum allowable virtual queue length 12216 that is the maximum allowable value of the virtual queue length, discard statistics 12217 indicating the number of packets that could not have been loaded in a virtual queue because the virtual queue length after update exceeds the maximum allowable virtual queue length at the time of packet relaying, relay statistics 12218 indicating the number of packets that could have been loaded in a virtual queue at the time of packet relaying.

The output band 12215 and the maximum allowable virtual queue length 12216 of the user are managed by a network administrator. Thus, these values may change depending on the coverage of a contract between the network administrator and the user. For example, there may be a case where when a reasonable contract is made, the output band is 100 Mbps, whereas when an expensive contract is made, the output band is 1 Gbps. It is in general difficult for users to understand the maximum allowable virtual queue length 12216, and therefore it is considered that the maximum allowable virtual queue length 12216 is seldom disclosed to users. For a user whose packets are frequently discarded, the edge nodes 31, 32 are replaced with devices in which the queues 3112, 3212 directed to users are longer respectively, or network interface cards in which the queues 3112, 3212 are long respectively are inserted into the edge nodes 31, 32 respectively, thereby enabling to avoid discarding of the packets addressed to the user. In such a case, the maximum allowable virtual queue length may differ on a user basis.

Figure 4:
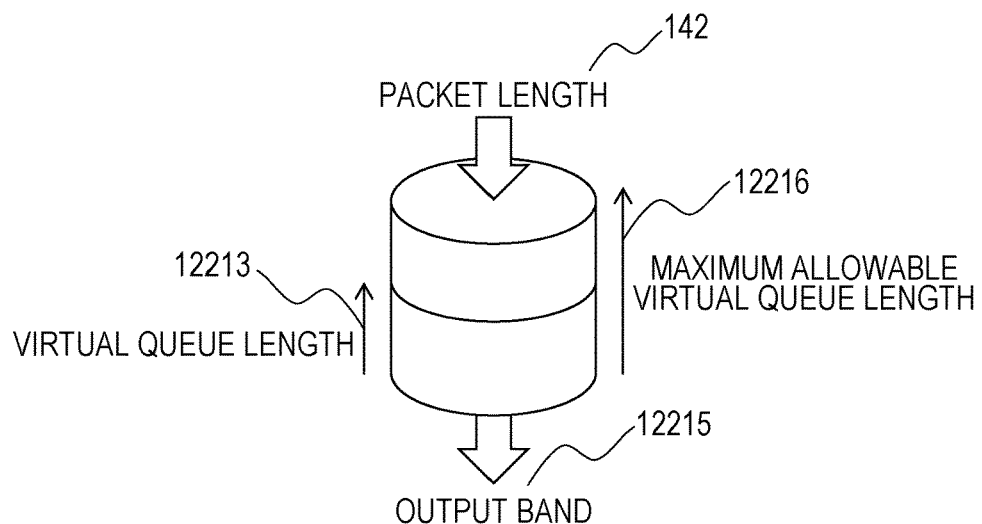
FIG. 4 is a diagram representing a model of a virtual queue that simulates a queue.

FIG. 4 is a diagram illustrating a virtual-queue model for updating the virtual queue length 12213 in the virtual queue length table 1221 shown in FIG. 3.

The virtual queue is used to simulate the real queue length of an edge node by the virtual queue length representing the amount of packet data loaded in a virtual queue. This model determines an estimated value of the real queue length in the edge node by: when a packet addressed to a user is relayed, adding the packet length 142 of the packet to be relayed to a value of the virtual queue length of the virtual queue of the user to simulate a state in which the packet is loaded; and subtracting a value of the virtual queue length with the lapse of time on the basis of the output amount of packets per time determined from the output band 12215 to simulate a state in which the packet is taken out. The maximum value that is allowable as the virtual queue length is set as the maximum allowable virtual queue length 12216. In the case of the virtual queue, although the length of the virtual queue is managed, packet data itself does not exist. Therefore, a memory for holding packet data is not required.

Figure 5:
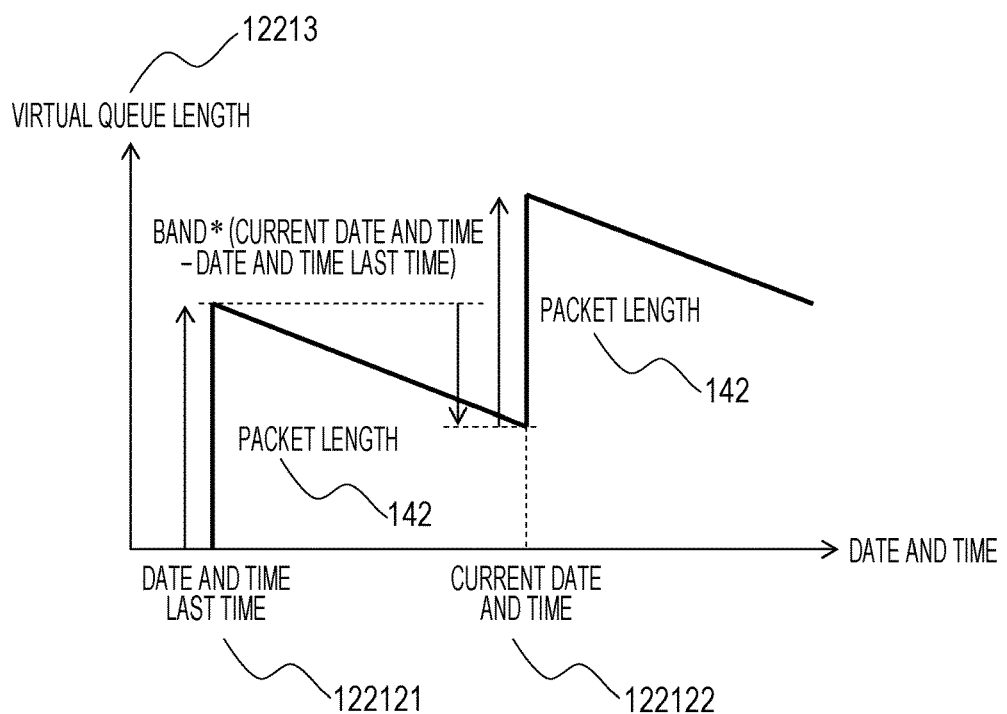
FIG. 5 is a graph representing a time change of the virtual queue length.

FIG. 5 is a graph representing a time change of the virtual queue length 12213 of the virtual queue shown in FIG. 4.

A packet is relayed at the date and time last time 122121, and a packet is then relayed again at the current date and time 122122. FIG. 5 shows a time change of the virtual queue length during this time. At the date and time last time 122121, the virtual queue length 12213 increases by the packet length 142. At the current date and time 122122, from a state in which the virtual queue length has decreased by the band*(the current date and time−the date and time last time), which is the amount of packets output from the virtual queue during a period of time from the date and time last time 122121 to the current date and time 122122, the virtual queue length 12213 increases by the packet length 142 of the virtual queue.

Figure 6:
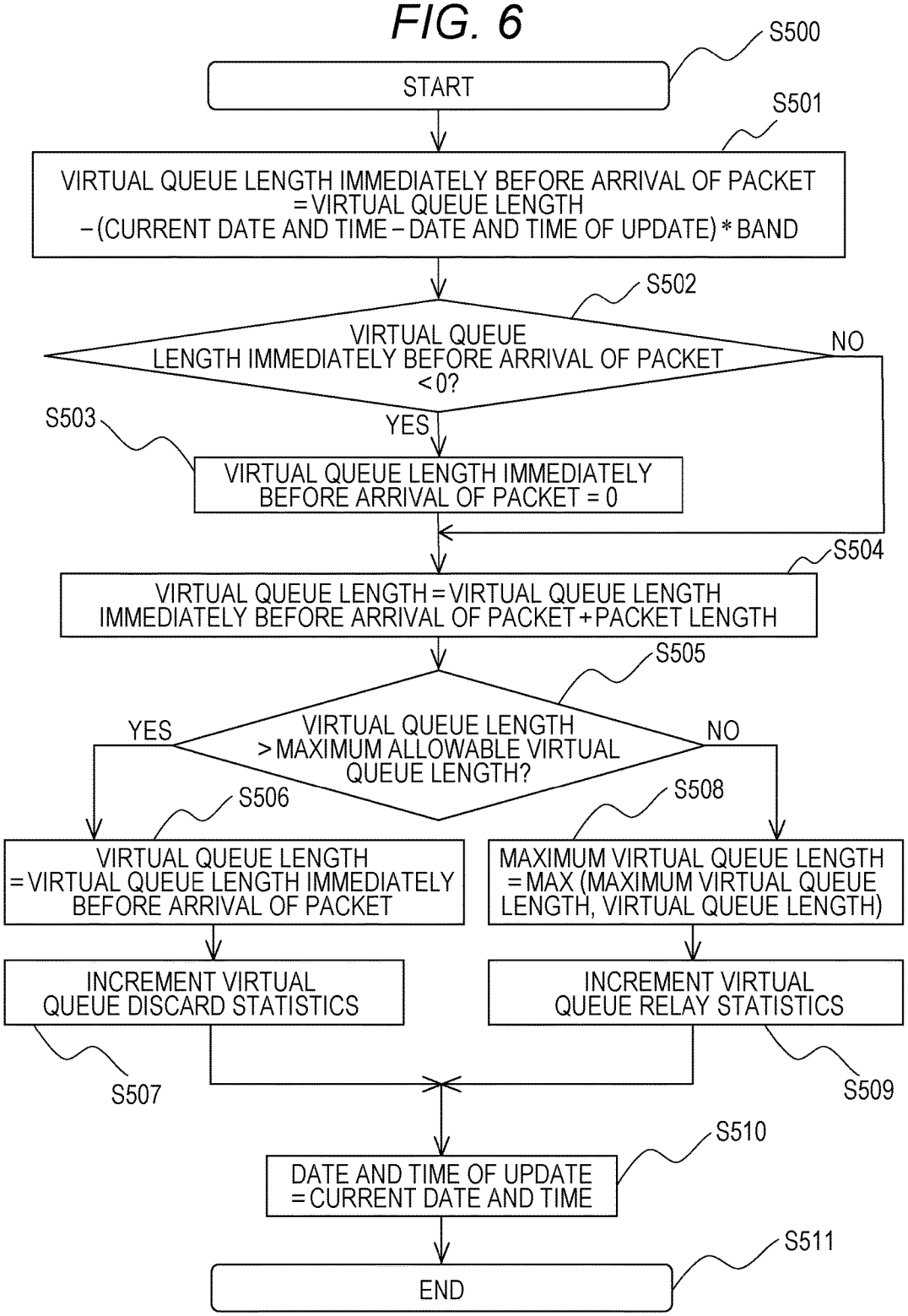
FIG. 6 is a flowchart illustrating a method for updating the virtual queue length table in the virtual queue length updating part at the time of packet relaying.

FIG. 6 is a flowchart showing a method for updating the virtual queue length table in the virtual queue length updating part 122 at the time of packet relaying.

After the packet relay part 11 shown in FIG. 1 relays a packet, when the virtual queue length calculation part 12 receives packet related data 14, the virtual queue length calculation part 12 executes a process after START S500 in the flowchart shown in FIG. 6. In S501, the virtual queue length immediately before the arrival of packet is calculated by (Mathematical expression 1): Virtual queue length immediately before the arrival of packet=Virtual queue length−(the current date and time−the date and time of update) band.

Next, in S502, a determination is made as to whether or not (Mathematical expression 2) Virtual queue length immediately before the arrival of packet <0 is satisfied. When it is determined to be YES, this means that the virtual queue has already been cleared at the time of the arrival of the packet. Therefore, in S503, processing of (Mathematical expression 3) Virtual queue length immediately before the arrival of packet=0 is executed. Subsequently, in S504, the packet length is added to the virtual queue length by (Mathematical expression 4) Virtual queue length=Virtual queue length immediately before the arrival of packet+Packet length. In S505, a determination is made as to whether or not (Mathematical expression 5) Virtual queue length>Maximum allowable virtual queue length is satisfied. In the case of YES, when the packet is loaded in the virtual queue, the maximum allowable virtual queue length is exceeded. In this case, the packet cannot be loaded in the virtual queue. Therefore, in S506, the queue length of the packet is not added to the virtual queue length as indicated in (Mathematical expression 6) Virtual queue length=Virtual queue length immediately before the arrival of packet, and in S507, the virtual queue discard statistics indicating the number of packets that could not have been loaded in the virtual queue, and therefore have been discarded, are incremented by one.

When the determination result is NO in S505, the maximum allowable virtual queue length is not exceeded even when the packet is loaded in the virtual queue. Therefore, the packet can be loaded in the virtual queue, and as shown in the mathematical expression 4 of S504, the packet length of the packet is added to the virtual queue length. Moreover, when the packet could have been loaded in the virtual queue, the maximum virtual queue length that indicates the past maximum value of the virtual queue length is updated in S508 as indicated by (Mathematical expression 7) Maximum virtual queue length=MAX (maximum virtual queue length, virtual queue length). Further, in S509, virtual queue relay statistics indicating the number of packets that could have been loaded in the virtual queue length are incremented by one.

Lastly, in S510, the date and time of update is updated as indicated by (Mathematical expression 8) The date and time of update=The current date and time, and in S511, this flowchart ends.

Figure 7:
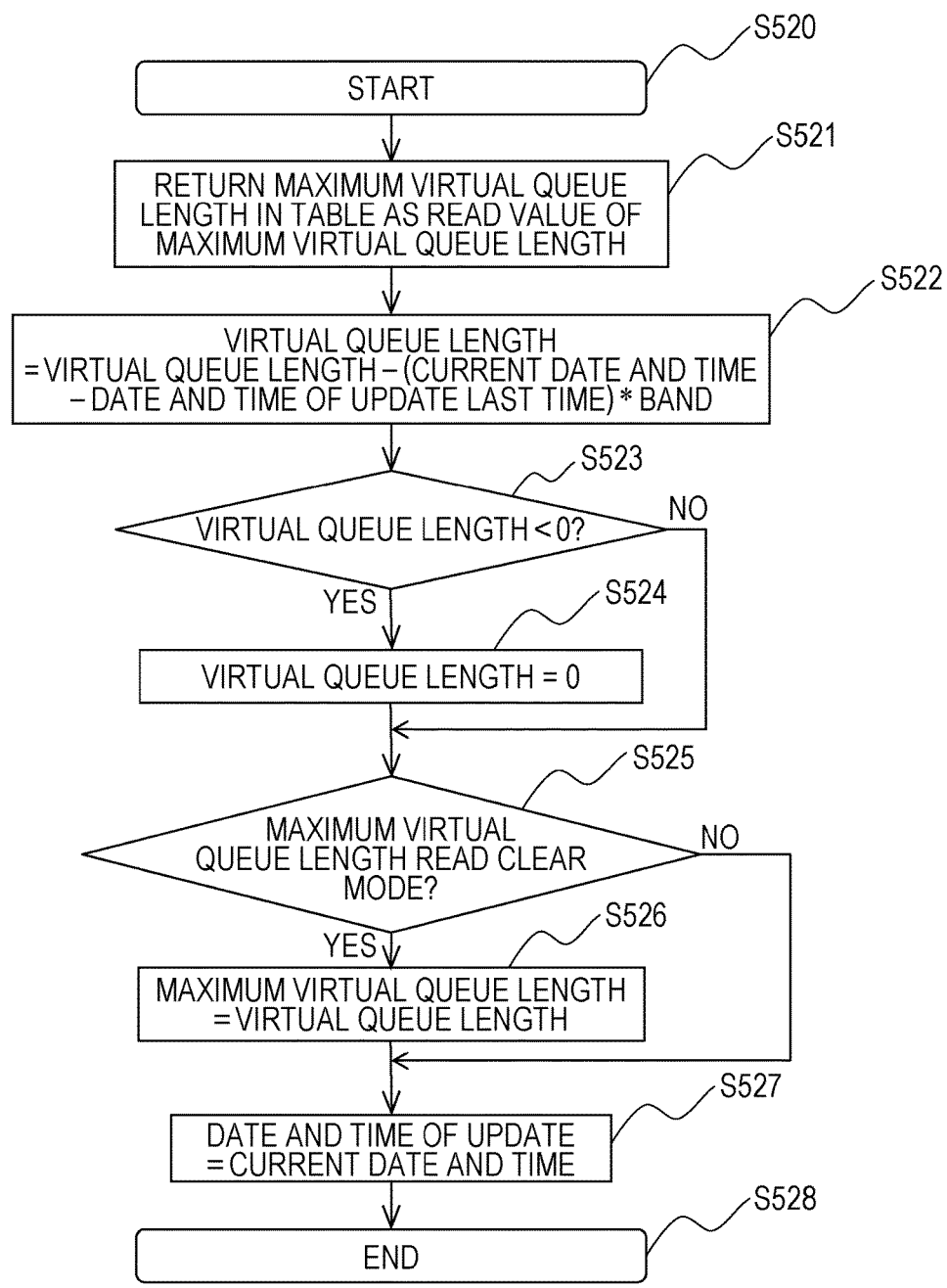
FIG. 7 is a flowchart illustrating a method for updating the virtual queue length table in the virtual queue length updating part when the maximum virtual queue length is read from a CPU part.

FIG. 7 is a flowchart illustrating a method for updating the virtual queue length table 1221 in the virtual queue length updating part 122 when the maximum virtual queue length 12214 is read from the CPU part 13 in FIG. 1.

When the maximum virtual queue length 12214 is read from the CPU part 13 in FIG. 1, the virtual queue length calculation part 12 executes a process from START S520 in the flowchart shown in FIG. 7. This flowchart is executed when a set value of the maximum virtual queue length read clear mode register 1222 shown in FIG. 2 is set at a value indicating clear. Here, it is assumed that when the set value of the maximum virtual queue length read clear mode register 1222 is, for example, 1, the set value is set for clear. When the set value of the maximum virtual queue length read clear mode register 1222 is set at 1, it is necessary to update the maximum virtual queue length 12214 even when the maximum virtual queue length 12214 is read. Therefore, the virtual queue length calculation part 12 executes the processing in the flowchart shown in FIG. 7.

In S521, the maximum virtual queue length 12214 in the virtual queue length table 1221 is returned as a read value of the maximum virtual queue length.

In S522, the virtual queue length is calculated by (Mathematical expression 9) Virtual queue length=Virtual queue length−(the current date and time−the date and time of update last time)*band, and in S523, a determination is made as to whether or not (Mathematical expression 10) Virtual queue length <0 is satisfied. When it is determined to be YES, this means that the virtual queue has already been cleared when the maximum virtual queue length is read. Therefore, in S524, processing of (Mathematical expression 11) Virtual queue length=0 is executed. Subsequently, in S525, a determination is made as to whether or not a current mode is the maximum virtual queue length read clear mode. When it is determined to be YES, in S526, processing of (Mathematical expression 12) Maximum virtual queue length=Virtual queue length is executed because of the read clear mode. This is a value based on the assumption that immediately after the maximum virtual queue length is cleared, the maximum virtual queue length is set at a value of the current virtual queue length. In the case of NO, the current mode is not the read clear mode, and therefore the value of the maximum virtual queue length is not updated.

Lastly, in S527, the date and time of update is updated as indicated in (Mathematical expression 13) The date and time of update=The current date and time, and in S528, this flowchart ends.

Here, the reason why not the virtual queue length 12213 but the maximum virtual queue length 12214 is read from the CPU part 13 is because the maximum virtual queue length 12214 that is the past maximum value of the virtual queue length is more useful for determining the overflow of the virtual queue than the virtual queue length 12213 itself. It is expected that the virtual queue length 12213 will drastically change with the lapse of time. Therefore, when a value of the virtual queue length 12213 is small by chance at the time of reading the value from the CPU part 13, there is a risk of underestimating the possibility of overflowing. However, since the maximum virtual queue length 12214 is the past maximum value of the virtual queue length, the possibility of overflowing can be more correctly estimated.

Moreover, when the current mode is set at a mode in which a value of the maximum virtual queue length read clear mode register 1222 is cleared at the time of reading, the maximum virtual queue length 12214 is cleared every time the maximum virtual queue length 12214 is read from the CPU part 13. Therefore, the value read from the CPU part 13 becomes the maximum value during a period of time from the reading last time until the reading this time. Periodically repeating the above processing enables to grasp the time change in the maximum value of the virtual queue length without causing the timing in which the time change in the maximum value of the virtual queue length is not read from the CPU part 13 as a maximum value to occur, and without reading the same maximum value a plurality of times during overlapped periods of time.

Figure 8:
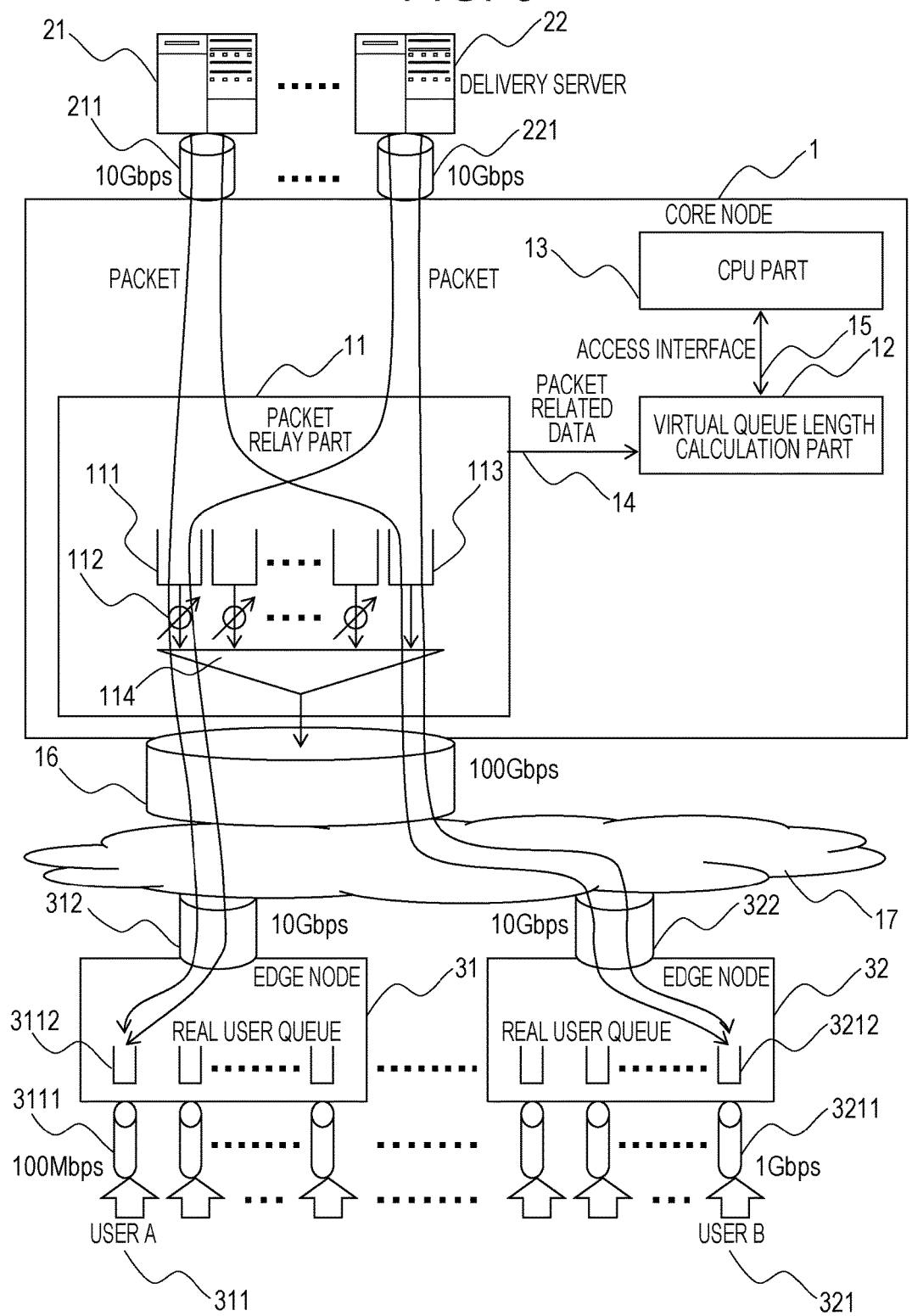
FIG. 8 is a diagram illustrating processing in a core node performed when a virtual queue overflows in the core node according to one embodiment of the present invention.

FIG. 8 is a diagram illustrating the operation of, when a virtual queue in the core node 1 overflows, avoiding discarding of a real queue by loading only packets of a user corresponding to the overflow in a shaper queue in the core node.

The shaper queue is a queue that has an output band control part 112 on the output side as indicated by reference numeral 111. The packet relay part 11 includes a plurality of queues each having the output band control part 112, and a queue 113 that does not have the output band control part, as indicated by reference numeral 111. The output of each queue is arbitrated by a component denoted by reference numeral 114, and a packet is output to a line 16.

When a virtual queue of a certain user, for example, a user A overflows in the virtual queue length calculation part 12, loading a packet directed to the user A in the shaper queue 111 causes the packet directed to the user A to be band-limited by the output band control part 112, thereby enabling to avoid discarding in the real queue 3112 directed to the user A in the edge node 31.

Figure 9:
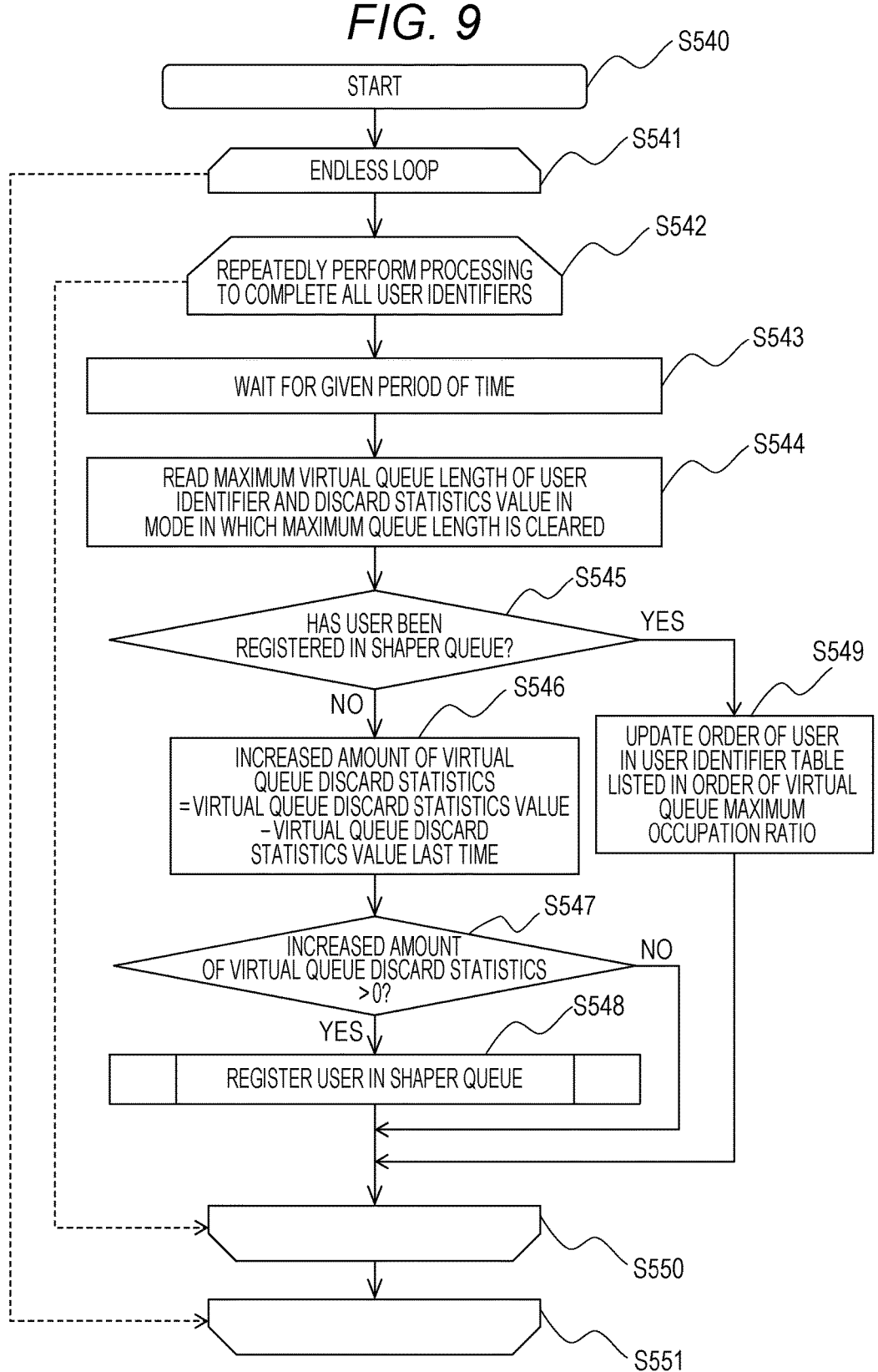
FIG. 9 is a flowchart illustrating a method for replacing a user to be registered in a shaper queue.

FIG. 9 is a flowchart showing a method for replacing a user to be registered in a shaper, which realizes the method for avoiding packet discarding shown in FIG. 8.

Processing shown in FIG. 9 is executed by the CPU part 13 in the core node 1.

After the start-up of the device, the process of FIG. 9 starts from START S540, and repeats processing from S541 to S551.

Processing is repeatedly executed for all user identifiers from S542 to S550 in a loop from S541 to S551.

S543 means an interval from the execution of processing for a certain user until the execution of processing for the next user. For example, when it is assumed that the waiting time is 1 ms and the total number of users is 100,000, the length of time taken to pass through the loop from S542 to S550, in other words, the length of time taken to complete processing for all users, is 100 seconds. In this case, traffic directed to the user comes to be registered in the shaper queue within 100 seconds after packet discarding of the certain user starts.

In S544, a value of the maximum virtual queue length read clear mode register is set at a mode in which the maximum queue length is cleared, and the maximum virtual queue length of the user identifier and a discard statistics value are read from the CPU part 13.

In S545, a determination is made as to whether or not the user has already been registered in the shaper queue. Here, "the user has already been registered in the shaper queue" means that one queue having a shaper is ensured, a band of the user is set to the queue, a range of a destination address addressed to the user is registered in the undermentioned shaper queue search table 117 in FIG. 11.

In the case of NO (the user has not yet been registered in the shaper queue), the virtual queue discard statistics of the user are calculated by (Mathematical expression 14) The increased amount of virtual queue discard statistics=Virtual queue discard statistics value−virtual queue discard statistics value last time. In S547, by (Mathematical expression 15) The increase amount of virtual queue discard statistics >0, a determination is made as to whether or not the virtual queue discard statistics of the user have increased.

Alternatively, the increased amount of the virtual queue relay statistics of the user is calculated by (Mathematical expression 16) The increased amount of virtual queue relay statistics=Virtual queue relay statistics value−virtual queue relay statistics value last time. The virtual queue discard rate of the user is calculated by (Mathematical expression 17) Virtual queue discard rate=The increased amount of virtual queue discard statistics/(the increased amount of virtual queue relay statistics+the increased amount of virtual queue discard statistics). Conditions in S547 are changed to (Mathematical expression 18) Virtual queue discard rate>Discard rate threshold value, thereby enabling to make a determination as to whether or not the user is registered in the shaper queue. Here, by configuring a threshold value of the discard rate to be small, for example, a level of $10^{-6}$, it is possible to prevent a user whose amount of discard is very small from being registered in the shaper queue, thereby enabling to prevent the number of users registered in the shaper queue from reaching the upper limit.

Alternatively, in S547, instead of determining whether or not the virtual queue discard statistics of the user has increased, a determination is made on the condition that (Mathematical expression 19) Maximum virtual queue length>Maximum allowable real queue length*determination threshold value, and (Mathematical expression 20) Determination threshold value <1, thereby enabling to detect, before an overflow occurs, a user for which there is a high possibility that a virtual queue will overflow due to the increase in virtual queue length. Making a determination on this condition enables to register a packet of the user in the shaper queue before an overflow of the real queue occurs, and therefore the overflow of the real queue can be prevented beforehand.

In addition, the virtual queue length is used to simulate the real queue length, and thus the overflow of the virtual queue does not accurately agree with the overflow of the real queue. Therefore, there is provided a method in which as a margin of accuracy in simulation, in the case of exceeding, for example, 50%, it is determined that there is a high possibility that the real queue will overflow, and consequently the packet is loaded in the shaper queue. Employing this method enables to more reliably avoid the real queue from being discarded.

When it is determined to be YES in S547, this means that the packet directed to the user overflows from the virtual queue. Therefore, the user is registered in the shaper queue in S548.

When it is determined to be YES in S545, the user has already been registered in the virtual queue, and therefore, in S549, only the order of the user in the user identifier table listed in order of the virtual queue maximum occupation ratio is updated. Here, the virtual queue maximum occupation ratio is a value indicating a ratio of the maximum virtual queue length that has ever increased until now to the maximum allowable virtual queue length of the user. The virtual queue maximum occupation ratio is calculated by (Mathematical expression 21) Virtual queue maximum occupation ratio=Maximum virtual queue length/maximum allowable virtual queue length. When this value reaches 100%, it is determined that discarding is occurring in the virtual queue.

Figure 10:
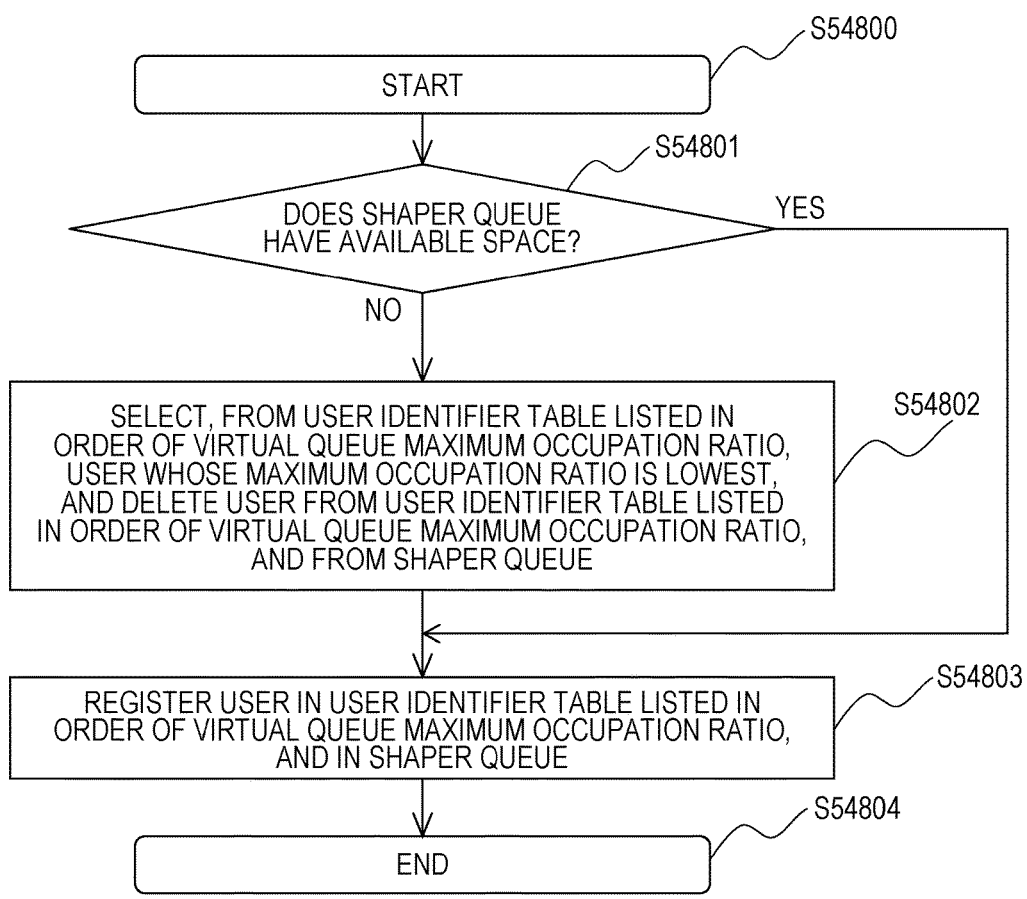
FIG. 10 is a flowchart illustrating processing of registering a user in the shaper queue.

FIG. 10 is a flowchart illustrating processing of S548 (subroutine "register the user in a shaper queue") in FIG. 9.

This subroutine starts in S54800.

In S54801, a determination is made as to whether or not a shaper queue has available space.

In the case of NO, the shaper queue does not have available space. Therefore, after carrying out processing of removing another user that has already been registered in the shaper queue as shown in S54802, the user is registered.

S54802 is processing of removing another user that has already been registered, thereby making space. As shown in FIG. 12 described below, a user whose maximum occupation ratio is the lowest is selected from the user identifier table listed in order of the virtual queue maximum occupation ratio, and the user is then deleted from the user identifier table listed in order of the virtual queue maximum occupation ratio, and from the shaper queue.

In S54803, since the shaper queue has available space or space has been made therein, the user is registered in the user identifier table listed in order of the virtual queue maximum occupation ratio, and in the shaper queue, in FIG. 12. In S54806, this subroutine ends.

Figure 11:
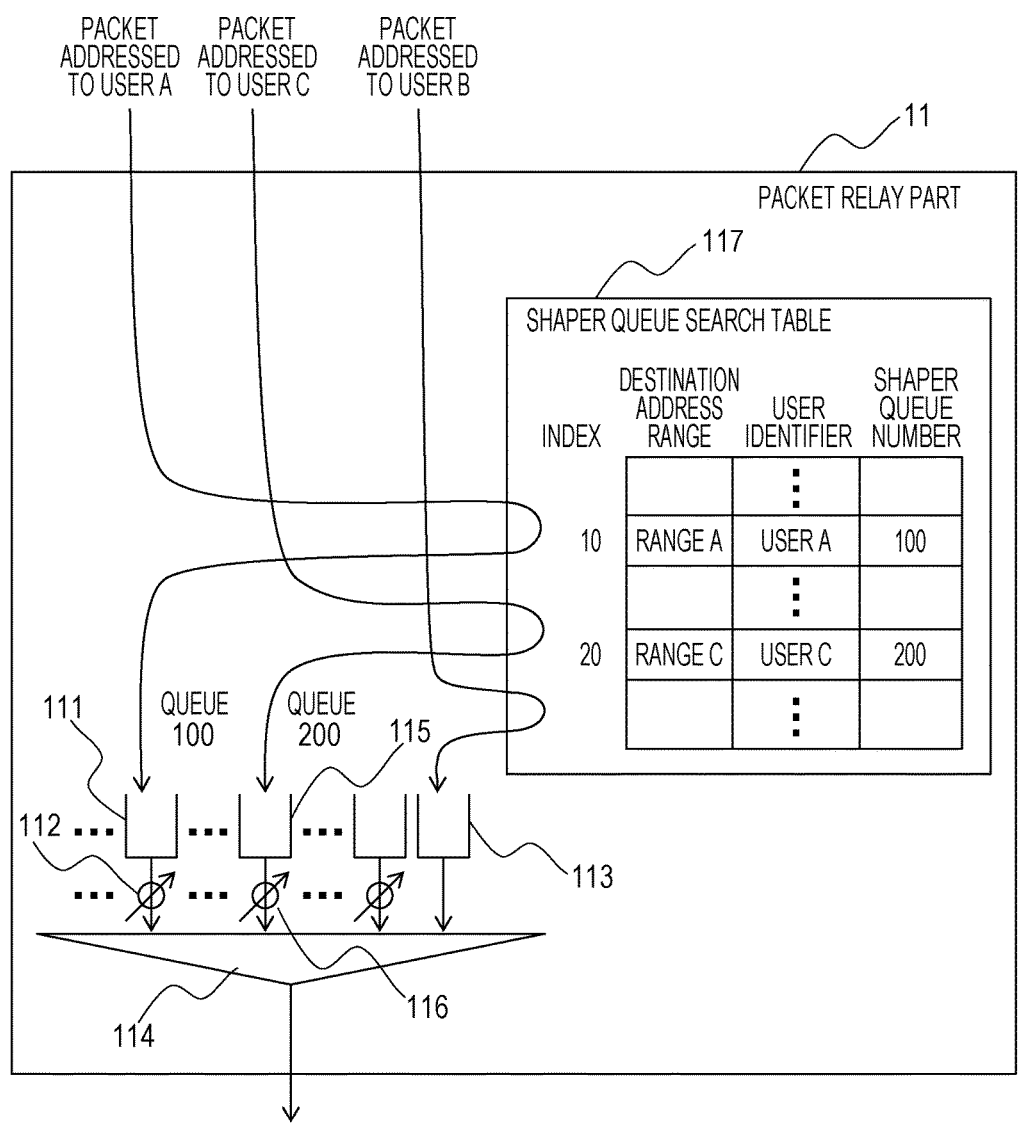
FIG. 11 is a diagram illustrating a shaper queue search table in the packet relay part, and shaper queues.

FIG. 11 is a diagram illustrating the shaper queue search table 117 and shaper queues in the packet relay part 11, which realizes the method for avoiding packet discarding shown in FIG. 8.

Reference numeral 117 denotes a search table that outputs, in the packet relay part 11, the result of determination as to whether or not a packet is loaded in a shaper queue at the time of packet relaying, and a queue number when the packet is loaded in the shaper.

When a packet is relayed by the packet relay part 11, the shaper search table 117 is searched by using a destination address as a search key. When a destination address of the packet falls within a destination address range of any of entries registered in the shaper queue search table 117, the packet is loaded in a shaper queue corresponding to a shaper queue number of the entry. Here, the reason why the destination address range is used as an index of the shaper queue search table 117 in the example shown in FIG. 11 is because it is assumed, as an example, that a subnet address is stored.

In the example shown in FIG. 11, as the result of searching the shaper search table 117 by using a destination address as a search key, for example, when a packet addressed to the user A falls within a destination address range A, the packet is loaded in a queue 111 having a shaper queue number of 100, and when a packet addressed to a user C falls within a destination address range C, the packet is loaded in a queue 115 having a shaper queue number of 200.

When the destination address of the packet falls within a destination address range of none of the entries registered in the shaper queue search table 117, the packet is loaded in a queue that does not perform shaping.

For example, when a packet addressed to the user B falls within a destination address range of none of the entries registered in the shaper queue search table 117, the packet is loaded in a queue 113 that does not perform shaping.

FIG. 12 shows an example of the user identifier table listed in order of the virtual queue maximum occupation ratio, which is used for the processing shown in each of FIGS. 9 and 10. This example indicates that with respect to ten users, the virtual queue maximum occupation ratio reaches 100%, and consequently the virtual queues thereof overflow, whereas with respect to the eleventh and subsequent users, the virtual queue maximum occupation ratio does not reach 100%. Since traffic addressed to each user changes in terms of time, even in the case of a user whose virtual queue have overflowed and thus have been registered in a shaper queue in the past, the traffic may decrease with the lapse of time. Accordingly, by always sorting users in order of the virtual queue maximum occupation ratio, and when the shaper queue has no more space, by removing a user whose maximum occupation ratio is the lowest with the result that even when the user is removed from the shaper queue, a possibility that discarding will occur is the lowest, discarding of a real queue can be more reliably avoided for all users.

FIGS. 13 and 14 show examples of tables other than the table in FIG. 12, the tables being required by the CPU part 13 to manage users and shaper queues in the core node 1. The examples indicated here are merely examples, and therefore other table formats may be employed.

FIG. 13 is a user information table that is used by the CPU part 13 to manage users in the core node 1. From the user information table, the CPU part 13 sets the output band 12215 and the maximum allowable virtual queue length 12216 in an entry of each user identifier of the virtual queue length table 1221 shown in FIG. 3, and sets the destination address range, the user identifier and the shaper queue number in an entry of each index of the shaper queue search table 117 shown in FIG. 11.

FIG. 14 is a shaper queue management information table that is used by the CPU part 13 to manage the shaper queues 111, 113, 115 in the core node 1. The CPU part 13 gets, from the shaper queue management information table, an index for registering as an index a shaper queue number in the shaper queue search table 117 shown in FIG. 11, and an index of the user identifier table listed in order of the virtual queue maximum occupation ratio shown in FIG. 12.

Alternatively, instead of automatically carrying out the processing shown in each of FIGS. 9 and 10 in the core node 1, a network administrator may be allowed to register a user in a shaper queue in the packet relay part 11 by use of a configuration definition by informing the network administrator of a state of a virtual queue on a user basis. This method is more suitable for a network administrator's management policy in which a network administrator desires to manage users to be registered in a shaper queue than a management policy in which users to be registered in the shaper queue are automatically replaced.

As a method for informing the network administrator of a state of a virtual queue on a user basis, the network administrator can be informed of the state by using, for example, the tabular form described below. As the display order, for example, the table is sorted in decreasing order of the virtual queue maximum occupation ratio. With respect to a user whose virtual queue maximum occupation ratio reaches 100% because of discarding of a virtual queue occurs. Therefore, further sorting the table in decreasing order of the virtual queue discard rate, and then displaying the table, enables the network administrator to easily know a user for which discarding is occurring, or a user for which there is a high possibility that discarding will occur. In addition, with respect to the order of sorting described above, the number of users to be displayed may be specified so as to display only users grouped into the higher rank.

TABLE 1

Display format of virtual queue states

| Virtual queue maximum occupation ratio | Virtual queue discard rate | User identifier |
|---|---|---|
| 100% | 10% | User A |
| 100% | 1% | User C |
| 100% | 0.1% | : |
| 99% | 0% | : |
| 80% | 0% | : |
| 50% | 0% | : |
| 20% | 0% | : |
| 5% | 0% | : |
| 1% | 0% | : |
| 0.1% | 0% | : |

The increased amount of the virtual queue discard statistics may also be displayed in Table 1.

In addition, not only the user identifier, but also an edge node to which the user belongs, the number of a line to which the user is connected in the edge node, and information about a user's contract such as a line speed may be displayed all together.

Figure 15:
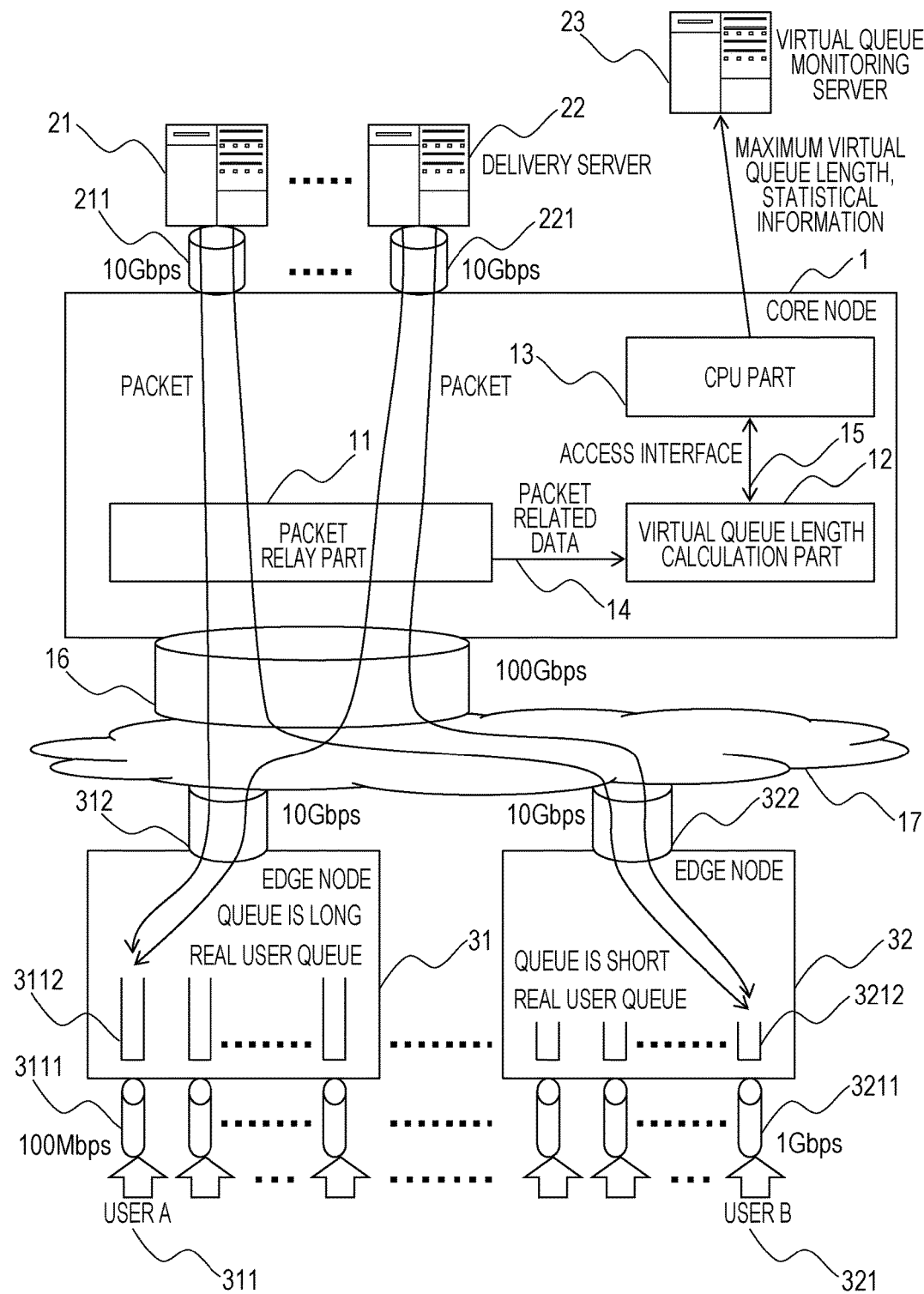
FIG. 15 is a diagram illustrating processing of avoiding discarding of a real queue by replacing an edge node with a device, the queue length of which is long, on the basis of the result of monitoring according to the present invention.

FIG. 15 is a diagram indicating that a packet discard situation of real user queues in each of the edge nodes 31, 32 is estimated by monitoring the virtual queue length in the core node 1 by use of a virtual queue monitoring server 23, and that discarding of the real queues 3112, 3212 is avoided by manually replacing each of the edge nodes 31, 32 with a device, the queue length of which is long, as necessary.

Information of the virtual queue length table shown in FIG. 3, which has been calculated by the virtual queue length calculation part 12, is read from the CPU part 13, and a user for which discarding is occurring in a virtual queue is grasped by reading, from the virtual queue monitoring server 23, statistical information including the maximum virtual queue length, the virtual queue discard statistics and the virtual queue relay statistics. Consequently, the edge node 31 that accommodates a user for which discarding is occurring, for example, the user A, is replaced with a device, the queue of which is long, or a network interface card of the edge node 31 is replaced with a network interface card, the queue of which is long, thereby enabling to avoid discarding.

Moreover, a level of the overflow can be grasped by making the maximum allowable virtual queue length on a user basis in the core node longer than a maximum value that can be taken as the real queue length in the edge node (hereinafter referred to as "maximum allowable real queue length"). For example, the maximum allowable virtual queue length is set at approximately four times the maximum allowable real queue length beforehand. When a maximum value of the virtual queue length reaches twice the maximum allowable real queue length, discarding is avoided by increasing the real queue length. In this case, it is understood that it is necessary to increase the real queue length up to twice.

In addition, a level of the overflow can also be grasped by concurrently calculating virtual queue lengths for a plurality of transmission bands on a user basis in the core node. For example, when a real transmission band of a line of a certain user, which is connected to an edge node, is 100 Mbps, virtual queue lengths are concurrently calculated at 100 Mbps, 200 Mbps and 400 Mbps for the user in the edge node. When the virtual queue length reaches the maximum allowable virtual queue length at 100 Mbps but does not reach the maximum allowable virtual queue length at 200 Mbps or more, discarding is avoided by increasing the speed of the line directed to the user in the edge node. In this case, it is understood that it is necessary to increase the speed up to 200 Mbps.

The core node simulates the virtual queue length on a user basis. However, since it is not necessary to provide a real queue on a user basis, the need for a memory required for providing a real queue is eliminated, thereby enabling to simulate virtual queue lengths of many users, for example, approximately 100,000 users.

By configuring a core node in the network to simulate the queue length of a queue directed to a user line in an edge node to which the user line is connected, the core node is capable of grasping, in a concentrated manner, a specific edge node that requires enhancement such as lengthening of a queue.

This eliminates the need for storing the maximum queue length and the like in each edge node, and for providing an interface capable of totalization from a totalization device. Therefore, low-cost devices can be used as edge nodes, the required number of which is much larger than that of core nodes.

Moreover, when the virtual queue length that has been simulated on a user basis in the core node reaches the maximum allowable virtual queue length, a packet directed to the user is loaded in one of a plurality of queues, each of which performs shaping in the core node. This enables to avoid packet overflow in the edge node for all users when the number of users each having a possibility that a real queue will overflow in an edge node is 10,000 users or less, even in the case where the number of queues each performing shaping is smaller than the number of all accommodated users (for example, 100,000 users), for example, even in the case of 10,000 queues.

Second Embodiment

Next, a second embodiment will be described.

Figure 16:
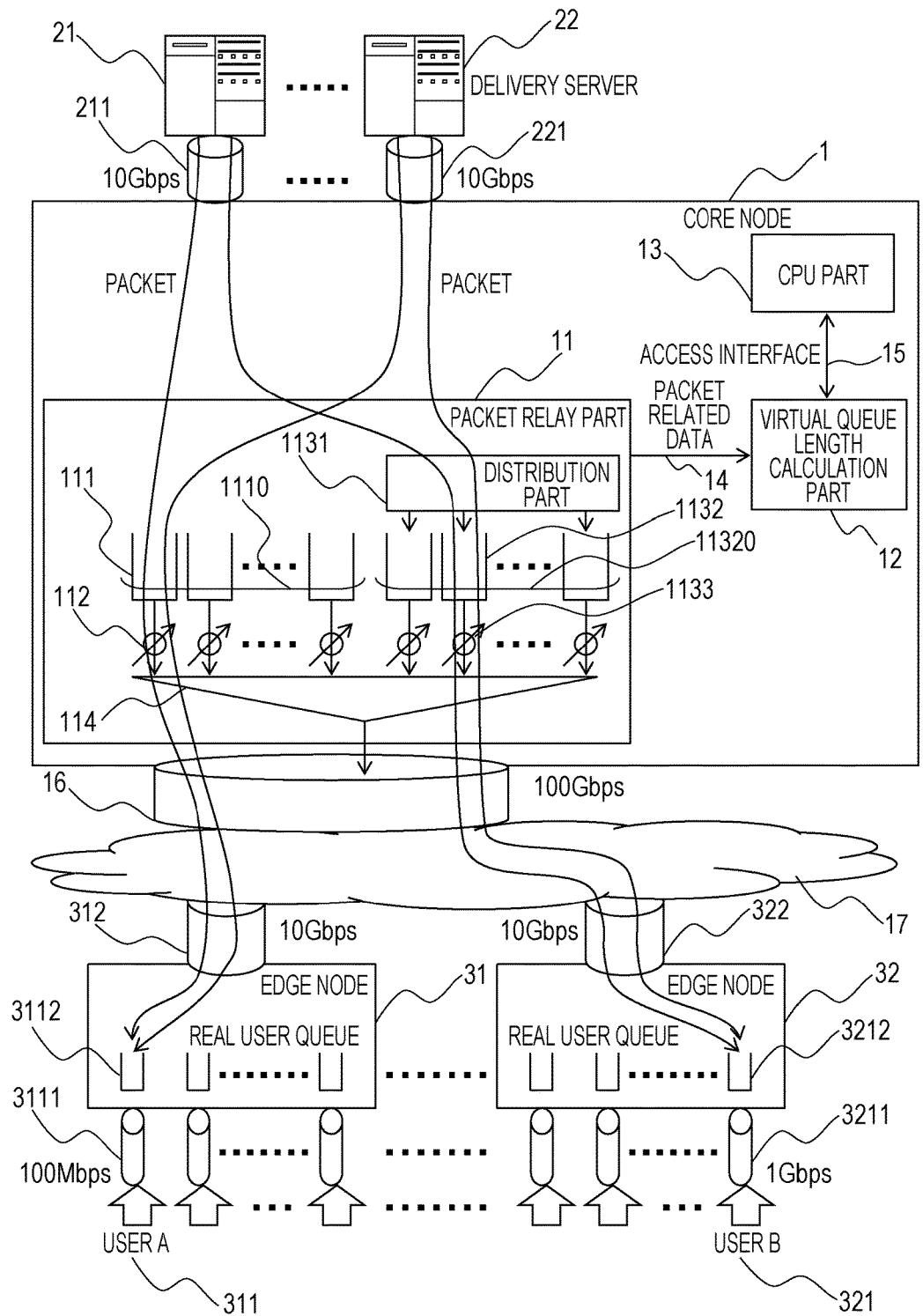
FIG. 16 is a diagram illustrating processing in a core node performed when a virtual queue overflows in the core node according to one embodiment of the present invention.

FIG. 16 is a diagram illustrating the operation of, when a virtual queue in the core node 1 overflows, avoiding discarding of a real queue by loading only packets of a user corresponding to the overflow in a shaper queue in the core node.

The second embodiment shows a configuration in which a core node is provided with a plurality of shaper queues, and packets on a user basis, each of which is directed to a user that is not registered in the shaper queue, are distributed into the plurality of shaper queues by means of hash, and are then loaded therein respectively.

In the core node 1 shown in FIG. 8 illustrating the first embodiment, packets on a user basis, each of which is directed to a user that is not registered in a shaper queue, are all loaded in the queue 113 that does not include an output band control part.

Meanwhile, the core node 1 shown in FIG. 16 illustrating the second embodiment is characterized by being provided with a plurality of shaper queues. In the second embodiment, each of packets on a user basis, each of which is directed to a user that is registered in a shaper queue, is loaded in any of a plurality of shaper queues 1110 on a user basis, and the other packets each being directed to a user are distributed into a plurality of shaper queues 11320 by a distribution part 1131 using a hash value obtained by a hash function that uses user identification information as hash key, thereby loading each of the other packets in any of the shaper queues 11320.

In FIG. 16, a passage route of a packet directed to the user A 311 is an example of a passage route of a packet directed to a user that is registered in a shaper queue on a user basis. The packet directed to the user A is loaded in the shaper queue 111 on a user basis, is subjected to the output band control by the output band control part 112, and is then output. A passage route of a packet directed to the user B 321 is an example of a passage route of a packet directed to any of the other users. The packet directed to the user B is distributed by means of hash and is loaded in a queue 1132, which is one of the plurality of shaper queues 11320, by the distribution part 1131, and is subjected to the output band control by the output band control part 1133, and is then output.

Only a packet directed to the user A is loaded in the queue 111, and therefore a band to be controlled by the output band control part 112 of the queue 111 can be determined according to a band of the line 3111 connected to the user A. Meanwhile, not only a packet directed to the user B but also packets directed to a plurality of users are loaded in the queue 1132, and therefore a band to be controlled by the output band control part 1133 of the queue 1132 cannot be determined according to a band of the line 3211 connecting to the user B. The band to be controlled by the output band control part 1133 of the queue 1132 is in general set at a value that is larger than the band of the line 3211 connecting to the user B.

According to the second embodiment, since it takes time to determine on a user basis whether or not the band control is required, when traffic directed to a certain user suddenly increases, it is possible to prevent overflow that may occur in a real queue of an edge node during a period of time from the time at which the traffic has increased until the registration in the shaper queue on a user basis. Alternatively, the frequency of overflow can be reduced.

Moreover, when the number of shaper queues is one as indicated in the first embodiment, a change in the amount of traffic directed to a certain user exerts an influence on the traffic directed to the other users, for example, fluctuations increase. However, in the second embodiment, queues are distributed by means of hash, and therefore the traffic can be controlled in such a manner that a change in the amount of traffic directed to a certain user does not exert an influence on the traffic directed to users to be loaded in the other queues.

Incidentally, the present invention is not limited to the above-described embodiments, and includes various modified examples. In addition, as a matter of course, the present invention is not limited to the above-described embodiments, and can be implemented in various modes. Moreover, part or all of the configuration, function, processing and the like described above may be realized by hardware, or may be realized by software.

What is claimed is:

1. A communication device that transmits, to a network, a packet addressed to a user, the packet being delivered from a server, and that transmits, to the server, a packet received through the network, the packet addressed to the user being transmitted to the user from an edge device located at an edge of the network, the communication device comprising:
    a packet relay part that relays a packet to be transmitted/received between the server and the network, performs band control of the packet, and extracts packet related information included in the packet;
    a virtual queue length calculation part that calculates, on a user basis, a virtual queue length, which is an estimated value of a queue length of a transmission queue addressed to the user in the edge device, on the basis of the packet related information and band information of a line between the edge device and the user to hold the virtual queue length, and determines, on a user basis, whether or not the band control is required, on the basis of the virtual queue length and predetermined conditions; and
    a control part that controls the packet relay part and the virtual queue length calculation part, on the basis of the result of the determination in the virtual queue length calculation part, to perform the band control of the packet addressed to the user on a user basis in the packet relay part, wherein
    the packet relay part has shaper queues, a number of which is smaller than a number of all of the users, and a user for which it is determined that the band control is required is assigned to the shaper queue,
    the packet relay part has a shaper queue search table in which the shaper queue, the user identifier, and a destination address range of the user identifier are associated with one another,
    the virtual queue length calculation part has, on a user basis, a user identifier and information about a ratio of the maximum virtual queue length to the maximum allowable virtual queue length that is the maximum allowable value of the virtual queue length, and
    on the basis of the shaper queue search table, and the information about the ratio of the maximum virtual queue length to the maximum allowable virtual queue length, a user that is assigned to the shaper queue is added or deleted.

2. The communication device according to claim 1, wherein:
the packet relay part extracts a packet length and a destination address as the packet related information; and
the virtual queue length calculation part sets a unique identifier on a user basis on the basis of the destination address, and identifies a user by using the user identifier to manage the virtual queue length, and to perform the band control.

3. The communication device according to claim 2, further comprising a plurality of shaper queues to which packets are distributed and assigned by means of a hash function, wherein
for a first user, the control part identifies a user by using the user identifier to manage the virtual queue length, and to perform the band control, on a user basis, and for a second user, the control part assigns a packet to the plurality of shaper queues by using the user identifier as a key.

4. The communication device according to claim 1, wherein
the determination, on a user basis, as to whether or not the band control is required is made on the basis of a maximum virtual queue length that is a past maximum value of the virtual queue length after the virtual queue length is cleared last time.

5. The communication device according to claim 1, wherein
the determination, on a user basis, as to whether or not the band control is required is made on the basis of a value determined from a number of packets that are expected to be discarded as a result of exceeding a maximum allowable virtual queue length that is a maximum allowable value of the virtual queue length.

6. The communication device according to claim 1, wherein
the determination, on a user basis, as to whether or not the band control is required is made on the basis of a value obtained by multiplying the maximum allowable virtual queue length by a predetermined threshold value.

7. A communication method used in a communication device that transmits, to a network, a packet addressed to a user, the packet being delivered from a server, and that transmits, to the server, a packet received through the network, the packet addressed to the user being transmitted to the user from an edge device located at an edge of the network, the communication method comprising:
extracting packet related information included in the packet;
calculating, on a user basis, a virtual queue length, which is an estimated value of a queue length of a transmission queue addressed to the user in the edge device, on the basis of the packet related information and band information of a line between the edge device and the user to hold the virtual queue length, and determining, on a user basis, whether or not band control is required, on the basis of the virtual queue length and predetermined conditions; and
on the basis of a result of the determination, performing, on a user basis, the band control of the packet addressed to the user in the packet relay part, wherein
shaper queues, a number of which is smaller than a number of all of the users, are provided, and a user for which it is determined that the band control is required is assigned to the shaper queue,
a shaper queue search table in which the shaper queue, the user identifier, and a destination address range of the user identifier are associated with one another is provided,
there are provided, on a user basis, a user identifier and information about a ratio of the maximum virtual queue length to the maximum allowable virtual queue length that is the maximum allowable value of the virtual queue length, and
on the basis of the shaper queue search table, and the information about the ratio of the maximum virtual queue length to the maximum allowable virtual queue length, a user that is assigned to the shaper queue is added or deleted.

8. The communication method according to claim 7, wherein
a packet length and a destination address are extracted as the packet related information, a unique identifier is set on a user basis on the basis of the destination address, and a user is identified by using the user identifier to manage the virtual queue length, and to perform the band control.

9. The communication method according to claim 8, wherein
for a first user, the control part identifies a user by using the user identifier to manage the virtual queue length, and to perform the band control, on a user basis, and for a second user, the control part assigns a packet to the plurality of shaper queues by using the user identifier as a key without identifying the user.

10. The communication method according to claim 7, wherein
the determination, on a user basis, as to whether or not the band control is required is made on the basis of a maximum virtual queue length that is a past maximum value of the virtual queue length after the virtual queue length is cleared last time.

11. The communication method according to claim 7, wherein
the determination, on a user basis, as to whether or not the band control is required is made on the basis of a value determined from a number of packets that are expected to be discarded as a result of exceeding a maximum allowable virtual queue length that is a maximum allowable value of the virtual queue length.

12. The communication method according to claim 7, wherein
the determination, on a user basis, as to whether or not the band control is required is made on the basis of a value obtained by multiplying the maximum allowable virtual queue length by a predetermined threshold value.

* * * * *